United States Patent

Larson et al.

[11] 3,800,588
[45] Apr. 2, 1974

[54] MULTIPLE AXIS CONTROL SYSTEM FOR VIBRATION TEST APPARATUS

[75] Inventors: Rodney L. Larson, St. Louis Park; Niel R. Petersen, Hopkins, both of Minn.

[73] Assignee: MTS Systems Corporation, Minneapolis, Minn.

[22] Filed: Apr. 30, 1971

[21] Appl. No.: 139,081

[52] U.S. Cl. .................................. 73/71.6
[51] Int. Cl. .......................................... G01n 29/00
[58] Field of Search .......... 73/67.3, 67.4, 71.4, 71.6

[56] References Cited
UNITED STATES PATENTS

| | | | |
|---|---|---|---|
| 3,477,281 | 11/1969 | Helmuth | 73/71.6 |
| 3,654,804 | 4/1972 | Helmuth | 73/71.6 |

OTHER PUBLICATIONS

Honnell, "Electromech. Transducer System...," Geophysics, p. 160–168, Jan. 1953.

Honnell, "Electronic Shake Table," Electronics, p. 178–179, June, 1954.

Primary Examiner—Donald O. Woodiel
Assistant Examiner—Arthur E. Korkosz
Attorney, Agent, or Firm—Dugger, Johnson & Westman

[57] ABSTRACT

Four vertically disposed hydraulic actuators act at spaced drive points on the underside of a rigid structure so as to impart vibratory motion thereto. The system herein disclosed takes signals representing displacement and load, and provides individual control signals for each actuator so that the actuators all work together to produce the desired motion called for by a program or command signal. In addition to correcting for vertical motion errors, the system also specifically corrects for roll errors. Correction for errors in the horizontal direction and also errors with respect to pitch are also contemplated.

10 Claims, 3 Drawing Figures

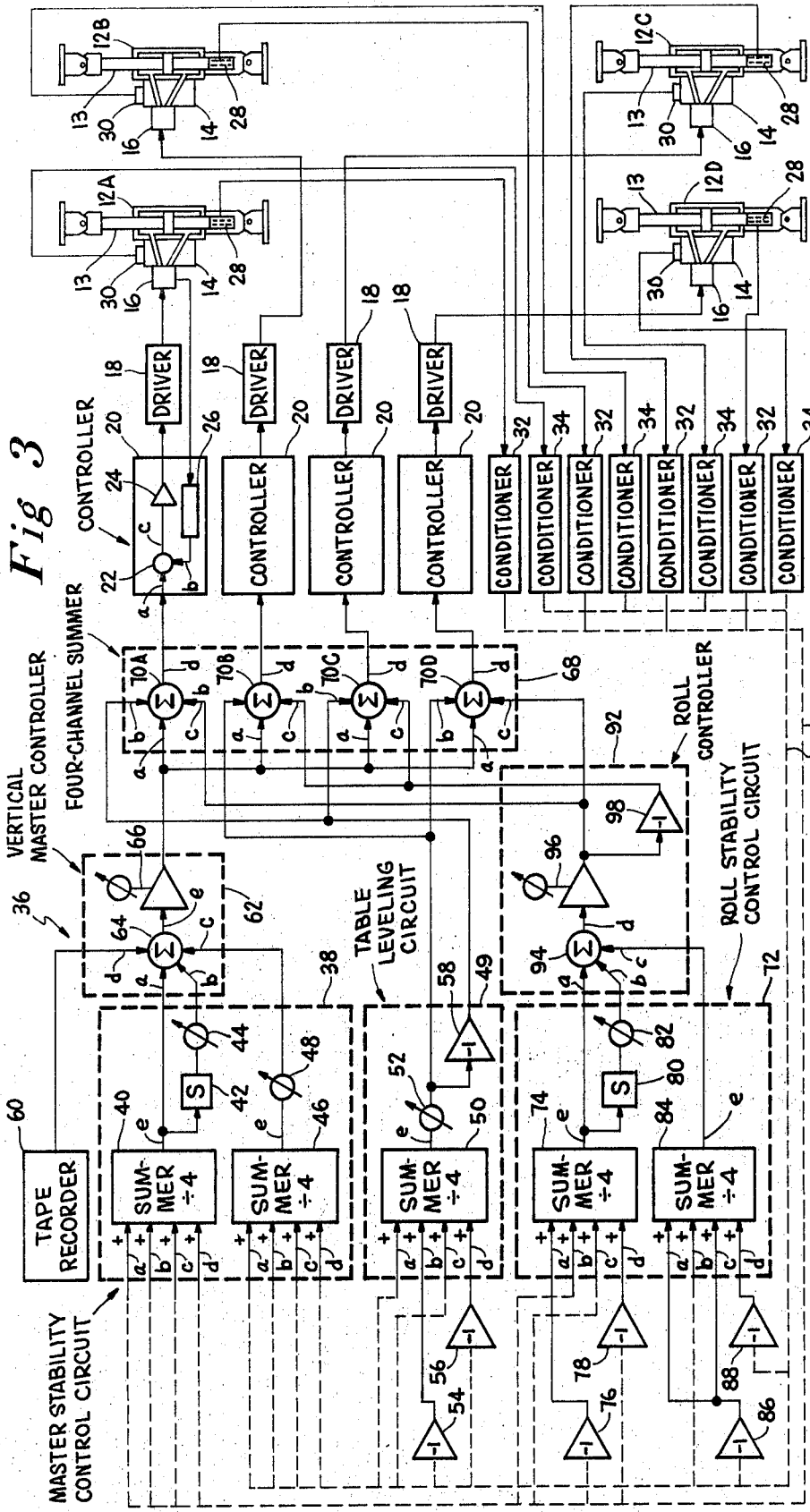
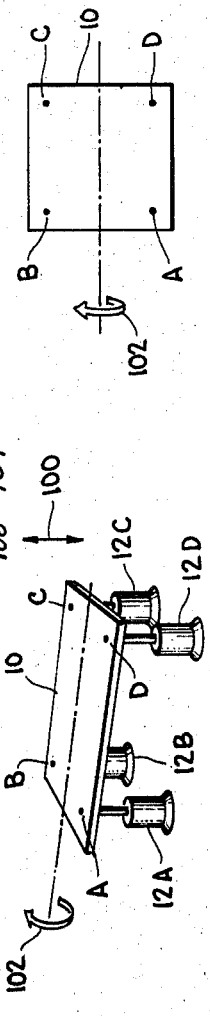

3,800,588

MULTIPLE AXIS CONTROL SYSTEM FOR VIBRATION TEST APPARATUS

BACKGROUND OF THE INVENTION

1. Field of the Invention

This invention relates generally to vibration test apparatus, and pertains more particularly to a system for controlling the movements of a rigid structure when vibrated along a plurality of axes.

2. Description of the Prior Art

When multiple actuators are required to move a vibration platform or table, or any rigid structure, in a single degree of freedom, the major control problem is to force all of the actuators to work together to produce the desired motions without objectionable loss of signal fidelity or efficiency. Independent control of each actuator has resulted in a very unsatisfactory result. Likewise, the employment of a master actuator for controlling the other actuators as slaves has not produced an acceptable degree of control in most situations. The main problems stem from force unbalance and low sensitivity to motions about any axis not in direct control. It can be explained that the force unbalance is caused by small dynamic displacement errors acting on the rigid body. This unbalance robs energy either from the individual actuator system or the master actuator system alluded to above, thereby making it virtually impossible to achieve maximum performance.

Further, motions about auxiliary axes are generally the result of loads being reflected back into the hydraulic system. The standard control techniques, in this instance, rely on the stiffness of the oil and the pressure to which the oil is subjected to retard these motions. The servovalve only responds to displacement errors, and usually the sensitivity is not high enough to anticipate these motion errors in sufficient time to enable the servovalve to provide the proper compensation.

SUMMARY OF THE INVENTION

A general object of the present invention is to provide a control system that will effectively overcome the principal problems heretofore experienced. More specifically, an aim of the invention is to provide a system in which signals representative of displacement and force are processed so that the proper control signals are derived which will compel the various actuators to operate in concert so as to produce the desired overall or composite motion without objectionable degradation.

Another object is to provide a control system possessing an appreciable amount of versatility. In this regard, it is within the contemplation of the invention to provide the proper amount of vertical motion to the rigid structure being tested, and also to compensate for roll errors. It is within the purview of the invention, however, to expand the system so as to compensate for horizontal motion errors in addition to vertical motion errors, and also to correct for pitch discrepancies where such errors present a problem.

Still further, an object is to provide a system of the foregoing character that can be readily added to existing vibration test apparatus.

Yet another object of the invention is to provide a control system that will be quite inexpensive and which will be highly reliable in its operation.

Briefly, the invention includes a master controller which controls the average vertical motion of the platform or table to reproduce the vertical command signal. The various actuators are constrained to work together as far as the opposing corners of the platform or table are concerned, when such a member constitutes the rigid structure. A summer provides a signal representative of the average vertical displacement of all four actuators. This signal is differentiated and algebraically summed with the average displacement signal and also the average command signal provided by a tape recorder or other program device. The resulting control signal is also influenced by a signal indicative of the total vertical force being supplied by the actuators against the platform or table, this force signal being algebraically summed with respect to the other above-mentioned signals to produce the control signal. Still further, a signal representing the level or inequality of the load or force applied by the various actuators is also used in producing the ultimate control signal.

The invention is additionally concerned with a system for compensating for roll errors, the same displacement and force signals as described above being utilized in the correction for roll errors. The system can also be expanded to correct for pitch errors without needing any additional signal information or data. Where additional actuators provide horizontal motions, the system lends itself readily to further expansion so as to correct for these errors as well.

BRIEF DESCRIPTION OF THE DRAWING

FIG. 1 is a perspective view showing a rigid platform and four hydraulic actuators therebeneath for imparting vibratory motion thereto;

FIG. 2 is a top plan view corresponding to FIG. 1 but depicting to better advantage the four drive points incorporated into the exemplary four-channel system, and FIG. 3 is a schematic or diagrammatic view depicting in somewhat greater detail the four hydraulic actuators shown in FIG. 1 and also depicting in conjunction therewith one form out multiple axis control system can assume, the illustrative system compensating for both vertical motion errors and roll errors.

DESCRIPTION OF THE PREFERRED EMBODIMENT

Referring now in detail to the drawings, a rigid structure has been pictured which constitutes a platform or table 10. It will be helpful at the outset to mention that four drive points A, B, C and D are employed in the illustrative situation. These drive points are provided by four hydraulic actuators 12 located beneath the platform or table 10. It will be helpful in the ensuing discussion to apply the suffix "A," "B," "C" and "D" to each actuator 12. Hence, it will be apparent that the actuator 12A acts on the drive point A, the actuator 12B on the point B, the actuator 12C on the point C, and the actuator 12D on the point D. As is conventional, each actuator 12 includes a piston rod 13, and each actuator further has associated therewith a valve manifold 14 and a servovalve 16 to which hydraulic fluid is supplied by a valve driver 18.

The driver 18 in each instance receives fluid from a valve controller denoted generally by the reference numeral 20. Each valve controller 20 includes a comparator or summing junction 22 having input terminals $a$ and *b* plus an output terminal *c*. Any difference between the signals applied to the inputs *a* and *b* appears as an error signal at the output terminal *c*, the signal being amplified by an amplifier 24. Further included in each valve controller 20 is a feedback amplifier 26 which supplies a signal indicative of the amount of fluid passing through the servovalve 16. Whereas the feedback amplifier 26 is connected to the input terminal *b* in each instance, the circuitry connected to the input terminal *a* will be described hereinafter.

The actuators 12 suggestively can each be an actuator designated as Model No. MTS Cylinder Series 204, this type of actuator being manufactured by MTS Systems Corporation of Minneapolis, Minnesota, the assignee of the invention herein described and claimed. However, it should be mentioned that each actuator 12 is equipped with a displacement transducer (LVDT) which is readily mounted within the housing of the actuator having the above-mentioned MTS model designation.

The transducer mentioned above has been labeled 28 in the drawing and it will be understood that it provides a signal proportional to the stroke of the piston rod 13. A differential pressure transducer 30 measures the pressure differential across the piston 13 and is mounted on the servovalve manifold 14. Consequently, it will be appreciated that the transducer 28 provides a signal representative of piston displacement and hence the vertical displacement of the particular drive point A, B, C or D on the platform 10 to which the associated actuator 12 is supplying vertical vibratory motion. On the other hand, the transducer 30 provides a signal representative of the force or load being applied to the particular drive point A, B, C or D by the actuator subjacent thereto.

Also, as is conventional, there is a feedback conditioner 32 associated with each transducer 28. Similarly, a conditioner 34 is connected to each of the transducers 30. The role played by the conditioners 32, 34 will be better understood as the description progresses. It should be kept in mind that the foregoing description, however, deals with components customarily used in connection with hydraulic servo systems designed for vibration testing.

Passing now to a description of the individual circuits comprising our multiple axis control system 36, it will be first noted that a master stability control circuit 38 is utilized. This circuit 38 includes a summer 40 having four input terminals *a*, *b*, *c* and *d* and a single output terminal *e*. The input terminal *a* is connected directly to the transducer 28 associated with the actuator 12A. Similarly, the input terminal *b* is connected to the transducer 28 for the actuator 12B. Also, the input terminal *c* is connected to the transducer 28 for the actuator 12C, and the fourth input terminal *d* is connected to the transducer 28 belonging to the actuator 12D. Inasmuch as the transducers 28 provide individual signals, each representative of the amount of vertical displacement of the platform 10, more specifically the displacements of the particular drive point A, B, C and D, the signals entering via the inputs *a*, *b*, *c* and *d* of the summer 40 can readily be averaged. Therefore, incorporated into the summer 40 is a dividing network which divides the input signals by a factor of 4. Hence, the output signal appearing at the terminal *e* of the summer 40 is representative of the average displacement of the platform 10 produced by the various actuators 12.

Connected to the output terminal *e* of the summer 40 is a differentiator 42 which differentiates the output signal so as to provide a signal indicative of the average rate of displacement. To provide the necessary adjustment or gain to the rate signal provided by the differentiator 42, there is a potentiometer 44. More will be said presently concerning the processing of both the average displacement signal and also the signal indicative of the average rate of displacement.

At this time, though, a further consideration of the master stability control circuit 38 shows that it includes an additional summer 46 having input terminals *a*, *b*, *c* and *d* plus an output terminal *e*. Connected to the output terminal *e* of the summer 46 is a potentiometer 48 by way of which an adjustment to the signal from the summer 46 can be made. It will be seen that in this instance the various input terminals *a*, *b*, *c* and *d* are respectively connected to the various transducers 30 which provide signals representative of the amount of force or load being applied to the underside of the platform 10. Here again, inasmuch as the output signal at the terminal *e* of the summer 46 represents the average differential pressure within the actuator, that is the force or load being applied to the platform 10, the signal is divided by a factor of 4 before it appears as the output signal at the terminal *e* of the summer 46.

Included in a table leveling circuit 49 is a summer 50 having input terminals *a*, *b*, *c* and *d* plus an output terminal *e*. The output terminal *e* is connected to a potentiometer 52 by way of which the magnitude of the resulting output signal can be properly adjusted. It will be noted that the terminals *b* and *d* in this instance are connected through inverting amplifiers 54 and 56 so that positive polarity signals are applied to all of the input terminals *a*, *b*, *c* and *d*. Although the reason therefor will not immediately be appreciated, there is an inverting operational amplifier 58 connected to the potentiometer 52. The processing of the uninverted and the inverted signals derived from the summer 50 will be described presently.

There is a tape recorder or other program device 60 which supplies the proper average command signal that the actuators 12 are intended to follow. However, in practice, the actuators are unable to follow the command signal and it is the function or purpose of the present invention to correct for the errors that would otherwise occur. Stated somewhat differently, when practicing the teachings of the instant invention, the vertical motion of the platform 10 is compelled to more closely approximate the intelligence contained in the vertical command signal supplied by the tape recorder 60.

Our multiple axis control system 36 further comprises a vertical master controlled 62 containing therein a summer 64. Although the summer 64 resembles the summers 40, 46 and 50, it is somewhat easier to utilize a schematic symbol rather than the block denoting the earlier-referred to summers. At any rate, the summer 64 has four input terminals *a*, *b*, *c* and *d* plus an output terminal *e*. The output terminal *e* is connected directly to a gain control 66.

Our multiple axis control system 36 additionally includes a four-channel summer 68 composed of individual summers 70. Inasmuch as one summer 70 is associated with the actuator 12A, it will be helpful to apply the suffix "A" to this particular summer. Likewise, the other summers 70 have been distinguished by the suffixes B, C and D. Each summer 70 has three input terminals *a*, *b* and *c* as well as an output terminal *d*. The connections of the input terminals *a*, *b* and *c* will be described below, but at this time attention is directed to the fact that the output terminal *d* is connected in each instance to the input terminal *a* of the previously mentioned comparators or summing junctions 22 contained within the various valve controllers 20. In other words, whatever signal appears at the output terminal *d* of the particular summer 70A, 70B, 70C or 70D will be the control signal for the actuator 12A, 12B, 12C or 12D, as the case may be. The manner in which the control signal, more precisely the correction contained therein, is derived will be better understood from the ensuing description.

Illustrative of the versatility of our system is that it can be augmented to correct for additional errors that might arise. It has already been pointed out that such an expanded system might very well correct for pitch errors as well as horizontal errors. However, it is not believed necessary to describe the components needed to effect pitch and/or horizontal correction by reason of the description now to be given in conjunction with the correction for roll. Therefore, attention is called to a roll stability control circuit 72 which includes a summer 74 having four input terminals *a*, *b*, *c* and *d* plus an output terminal *e*. It will be recognized that these input terminals *a*, *b*, *c* and *d* are connected to the displacement transducers 28. More particularly, it will be noted that the input terminals *b* and *c* of the summer 74 are connected directly to the transducer 28 for the actuator 12A. However, in order to apply positive polarity signals to the terminals *a* and *d*, these two terminals are connected to the transducers 28 for the actuators 12A and 12D, respectively, through inverting amplifiers 76 and 78, respectively.

It will, therefore, be recognized that the output signal at the output terminal *e* of the summer 74 is representative of the roll displacement. To provide a signal indicative of the roll rate of displacement, this signal is differentiated by a differentiator 80. For the purpose of adjusting the value of the differentiated signal a potentiometer 82 is employed.

Further included in the roll stability control circuit 72 is a second summer 84 having input terminals *a*, *b*, *c* and *d* as well as an output terminal *e*. The input terminals *a*, *b*, *c* and *d* of the summer 84 are connected to the force or load transducers 30 in the same order or arrangement as already described with respect to the summer 74. Of course, the transducers 30 are herein involved in contradistinction to the transducers 28 for the summer 74. It will also be noted that the terminals *a* and *d* are connected through inverting amplifiers 86 and 88, respectively. The output terminal *e* belonging to the summer 84 thus carries a signal indicative of the inequality of load or force applied by the actuators 12A, 12B, 12C and 12D and may be adjusted as to magnitude by a potentiometer 90.

A roll controller 92 functions in a somewhat similar fashion to the earlier-mentioned controller 62. It includes a summer 94 having three input terminals *a*, *b* and *c* plus an output terminal *d*. The output terminal *d* of the summer 94 is connected to a gain control 96. Inasmuch as the purpose of the controller 92 is to correct for roll errors, it is necessary to provide an inverted signal as far as the output signal appearing at the output terminal *d* of the summer 94; therefore, an inverting amplifier 98 is employed.

It should be apparent that the four summers 70A, 70B, 70C and 70D supply command signals containing the proper information or intelligence which reflect any deviation as far as vertical displacement or roll is concerned. It may be of some help to label the vertical, double headed arrow representing the vertical controlled motion by the reference numeral 100 and the arcuately configured arrow indicative of the roll motion by the reference numeral 102. This has been done in FIG. 1 for the arrow 100, and in both FIGS. 1 and 2 for the arrow 102.

The connections of the conditioners 32 to the summers 40 and 74 have already been described. Because of space difficulties the individual lines have not been shown in the drawing. For the sake of simplicity, it can be considered that the individual lines have simply been grouped together in a cable-like fashion, the cable or group being denoted by a single broken or dash line labeled 104. For the same reason, a single line 106 has been employed to designate in a collective manner the individual lines extending from the conditioners 34 to the summers 46, 50 and 84.

OPERATION

The detailed description given already should be adequate for an understanding of the operation that takes place with the system described. It will be recognized, though, that the correction for roll errors is taken care of along with the correction for vertical motion errors, whereas no attempt has been made to correct for any horizontal errors inasmuch as no horizontally disposed actuators have been shown. The problem of pitch correction, though, is inherent in the particular vibration test apparatus that has been illustrated; however, the manner in which our system can be augmented to take care of such a correction if circumstances so dictate should be readily apparent without specific description.

Recapitulating for the moment, to make certain that the operation is understood as far as the components described in FIG. 3 are concerned, it will be understood that if any one of the actuators 12 is not precisely following the command signal delivered from the recorder or other device 60, then it immediately affects the magnitude of the signal appearing at the output terminal *e* of the summer 40. Even if this rate is relatively slow, it will be understood that there will be a difference between the signal applied to the input terminal *a* of the summer 64 contained in the vertical master controller 62. Any difference between the magnitude of the signal impressed on the terminal *a* of this summer 64 will produce a difference or error signal with respect to the average signal introduced via the input terminal *d* of the summer 64. If the change is rather rapid, then the differentiator 42 will produce even a more pronounced difference which will be reflected into the output signal at the terminal *e* of the summer 40. The total vertical force represented by the signal delivered from the output terminal *e* of the summer 46 will also be instrumental in forming or providing the proper signal at the output terminal *e* of the summer 64. Thus, whatever changes occur, algebraically speaking, at the four input terminals *a*, *b*, *c* and *d* of the summer 64 will be contained in the signal arriving at the input terminal *a* of each summer 70A, 70B, 70C and 70D of the four-channel summer 68. Any such change will in turn be reflected in the output signal appearing at the output terminal *d* of these summers 70A, 70B, 70C and 70D.

On the other hand, should there be a change in the load or force inequality as represented by the output signal at the terminal *e* of the summer 50 of the master stability control circuit 38, the change will be reflected in the input signals at the terminals *b* of the summers 70A–70D. In this regard, the signals delivered to the input terminals *b* of the summers 70B and 70D will have the same polarity as the level signal appearing at the output terminal *e* of the summer 50, whereas the signals delivered to the terminals *b* of the summers 70A and 70C will have a reverse polarity. Hence, any inequality as far as the level of force delivered in a collective sense by the actuators 12 will be promptly corrected for.

If there should be a change in the roll displacement signal appearing at the output terminal *e* of the summer 74, then the roll controller 92 will deliver appropriate signals to the remaining input terminals *c* of the summers 70A–70D. More specifically, the signals delivered to the terminals *c* of the summers 70A and 70C will have an inverted polarity with respect to the polarity provided at the output terminal *e* of the summer 74, whereas the signals delivered to the terminals *c* of the summers 70B and 70D will be inverted.

From the foregoing, it should be evident that if any actuator 12 is not causing the displacement or is not supplying the force it should, there will be a correction made so that the action by each of the actuators 12 will be proper and the ensuing vertical motion or roll motion will be effectively compensated for should there be any discrepancies or errors arising. It should be apparent at this stage that if horizontal corrections or corrections for pitch deviations are desired, the system can be expanded upon to include additional control circuits and controllers to achieve this goal. Sometimes, correction for twist must be made. In this regard, it will be understood that the platform or table 10 is quite sizable and may be on the order of 20 feet on each side. Likewise, the platform or table 10 might constitute virtually any sizable structure. For instance, it might be an airplane wing to be subjected to appropriate vibrations in the course of fully testing its structural capabilities. Whatever the usual errors happen to be, it is within the scope of the invention to correct for these by appropriately sensing the displacement and force applied along certain axes. Thus, our system is truly a multiple axis structure control system.

We claim:

1. Vibration test apparatus comprising a plurality of actuating devices for imparting vibratory motion to a rigid structure, first means supplying a command signal representative of a desired average displacement of said structure to be produced by said actuating devices, second means providing a signal representative of the actual average displacement of said structure, third means for differentiating said actual average displacement signal to provide a signal representative of the average rate of structure displacement, fourth means providing a signal representative of the average force applied to said structure by said actuating devices, fifth means providing a signal representative of the average amount of force inequality applied to said structure by said actuating devices, the sixth means connected to said first, second, third, fourth and fifth means for deriving from said signals a control signal for each of said actuating devices.

2. Apparatus in accordance with claim 1 in which said second means includes a first summer having an input terminal for each actuating device and an output terminal for supplying said actual average displacement signal, and said fourth means includes a second summer having an input terminal for each actuating device and an output terminal for supplying said average amount of force signal.

3. Apparatus in accordance with claim 2 in which said sixth means includes a third summer having a plurality of input terminals connected to said first, second, third and fourth means.

4. Apparatus in accordance with claim 3 including a displacement transducer for each actuating device and also a differential pressure transducer for each actuating device, said displacement transducers connecting said actuating devices to the input terminals of said first summer and said pressure transducers connecting said actuating devices to the input terminals of said second summer.

5. Apparatus in accordance with claim 4 including a fourth summer having a plurality of input terminals connected to said pressure transducers and an output terminal, an inverting amplifier connected to the last-mentioned output terminal, said plurality of actuating devices including four devices and said sixth means including a four-channel summing means having first, second, third and fourth additional summers, each having first and second input terminals and an output terminal, the output terminal of said third summer being connected to each of said first input terminals of said additional summers and the output terminal of said fourth summer being connected to the second input terminals of said second and fourth additional summers and said inverting amplifier being connected to the second input terminals of said first and third additional summers.

6. Apparatus in accordance with claim 5 including a fifth summer having an input terminal for each actuating device and connected to the displacement transducer for the particular actuating device with which it is associated and an output terminal, means connected to the output terminal of said fifth summer for differentiating the signal from said fifth summer, a sixth summer having an input terminal for each actuating device connected to the pressure transducer for the particular actuating device with which it is associated, said sixth means further including a seventh summer having a first input terminal connected to the output terminal of said fifth summer, a second input terminal connected to said last-mentioned differentiating means, a third input terminal connected to the output terminal of said sixth summer and having an output terminal, a second inverting amplifier connected to the output terminal of said seventh summer, each of said additional summers in said four-channel summing means having a third input terminal, the third input terminals of said first and fourth additional summers being connected to the output terminal of said seventh summer and the third input terminals of said second and third additional summers being connected to said second inverting amplifier.

7. Vibration test apparatus comprising a table, four vertically disposed hydraulic actuators for vibrating said table, a displacement transducer associated with each of said actuators, a pressure transducer also associated with each of said actuators, a master stability control circuit connected to said transducers, a vertical master controller connected to said master stability control circuit for comparing signal information therefrom with a desired command signal, a table leveling circuit connected to said pressure transducers, and a four-channel summer having first input terminals connected to said vertical master controller and second input terminals connected to said table leveling circuit, the output terminals of said four-channel summer controlling said actuators.

8. Apparatus in accordance with claim 7 including a roll control stability circuit connected to said transducers, a roll controller connected to said roll control stability circuit, said four-channel summer having third input terminals connected to said roll controller so that the output terminals of said four-channel summer provide control signals for said actuators as modified by said roll controller.

9. A test apparatus comprising a plurality of displacement generating devices for displacing a rigid structure constrained for movement in a vibratory path, first means supplying a first command signal representative of a desired average displacement of said structure to be produced by said displacement generating devices, second means providing a second signal representative of the actual average displacement of said structure, third means providing a third signal representative of the average amount of force inequality between said displacement generating devices as actually applied to said structure by said displacement generating devices, and control means connected to said first, second and third means for providing a control signal for each of said displacement generating devices which is a function of each of the first, second and third signals to control the displacement of the displacement generating devices as a function of the displacement of each of said displacement generating devices relative to the desired displacement thereof.

10. Apparatus in accordance with claim 9 and fourth means to provide a signal which is a function of the rate of structure displacement, said fourth means also being connected to said control means.

* * * * *

PO-1050
(5/69)

UNITED STATES PATENT OFFICE
CERTIFICATE OF CORRECTION

Patent No. 3,800,588　　　　　　　　Dated　April 2, 1974

Inventor(s)　Rodney L. Larson et al.

It is certified that error appears in the above-identified patent and that said Letters Patent are hereby corrected as shown below:

Column 2, line 42, "out" should be --our--. Column 7, line 67, (Claim 1, line 15) "the" should be --and--.

Signed and sealed this 13th day of August 1974.

(SEAL)
Attest:

McCOY M. GIBSON, JR.　　　　　　C. MARSHALL DANN
Attesting Officer　　　　　　　　Commissioner of Patents